United States Patent [19]

Sakashita et al.

[11] Patent Number: 5,606,007
[45] Date of Patent: Feb. 25, 1997

[54] PROCESSES FOR PREPARING AROMATIC POLYCARBONATES

[75] Inventors: Takeshi Sakashita, Iwakuni; Tomoaki Shimoda, Kuga-gun; Hideyuki Itoi, Utsunomiya; Takashi Nagai, Otake; Kotarou Kishimura, Iwakuni, all of Japan

[73] Assignee: General Electric Company, Pittsfield, Mass.

[21] Appl. No.: 67,245

[22] Filed: May 21, 1993

Related U.S. Application Data

[63] Continuation of Ser. No. 627,138, Dec. 13, 1990, abandoned.

[30] Foreign Application Priority Data

| Dec. 28, 1989 | [JP] | Japan | 1-344042 |
| Mar. 30, 1990 | [JP] | Japan | 2-85218 |
| Aug. 3, 1990 | [JP] | Japan | 2-207076 |
| Aug. 3, 1990 | [JP] | Japan | 2-207078 |

[51] Int. Cl.$^6$ .................... C08G 63/00

[52] U.S. Cl. .................. 528/176; 528/180; 528/182; 528/194; 528/195; 528/196; 528/202; 525/461; 525/462

[58] Field of Search .................... 528/176, 180, 528/182, 194, 195, 196, 202; 525/461, 462

[56] References Cited

U.S. PATENT DOCUMENTS 3,833,537   9/1974   Jaquiss et al. .................. 524/109

FOREIGN PATENT DOCUMENTS 0351168   1/1990   European Pat. Off. .
1049478   11/1966   United Kingdom .

Primary Examiner—Shelley A. Dodson

[57] ABSTRACT

According to the present invention, there is provided an improvement which comprises adding an acid compound and if necessary an epoxy compound to a reaction product resulting from melt polycondensation reaction of an aromatic dihydroxy compound with a carbonic acid diester in the presence of an alkaline compound catalyst.

4 Claims, No Drawings

PROCESSES FOR PREPARING AROMATIC POLYCARBONATES

This is a continuation of application Ser. No. 07/627,138 filed Dec. 13, 1990 now abandoned.

FIELD OF THE INVENTION

This invention relates to processes for preparing aromatic polycarbonates, by which aromatic polycarbonates excellent in heat resistance, molding stability, water resistance and weathering resistance can be prepared.

This invention also relates to aromatic polycarbonate compositions having excellent heat resistance, molding stability, water resistance and weathering resistance.

BACKGROUND OF THE INVENTION

Because of their excellent mechanical characteristics, such as impact strength, and because of their excellent heat resistance and transparency, polycarbonates are widely used for various purposes.

Usually, polycarbonates are prepared by direct reaction of aromatic dihydroxy compounds such as bisphenol with phosgene (interfacial method) or by ester interchange reaction (polycondensation reaction) with carbonic acid diesters such as diphenyl carbonate.

In a process of preparing polycarbonates by ester interchange reaction of aromatic dihydroxy compounds with carbonic acid diesters, the reactants are allowed to react in a molten state by heating under reduced pressure usually in the presence of alkaline compounds used as alkaline catalysts. This process, therefore, has such an advantage that the desired polycarbonates can be prepared at a relatively low cost in comparison with the above-mentioned interfacial method.

Such alkaline catalysts as mentioned above are preferably those containing alkali metal compounds and/or alkaline earth metal compounds from the standpoint that the ester interchange reaction or polymerization reaction can proceed thereby at a sufficient rate.

However, we have discovered disadvantages resulting from the use of these alkaline catalysts. The alkali metal compounds and or alkaline earth metal compounds contained in the catalysts remain in the resulting polycarbonate in large amounts, and the remaining compounds adversely exert serious influences upon heat resistance, molding stability (melt stability when molding), water resistance and weathering resistance inherent in polycarbonate.

On that account, it has been strongly desired the advent of a process for preparing aromatic polycarbonates excellent in heat resistance, water resistance and weathering resistance, and also stable even when allowed to stand in a molten state for an extended period of time in a case where the desired aromatic polycarbonates have been intended to obtain by melt polycondensation of aromatic dihydroxy compounds in alkaline compound catalysts with carbonic acid diesters. In addition, it has also been strongly desired the advent of an aromatic polycarbonate composition having the above-mentioned properties.

OBJECT OF THE INVENTION

The present invention is intended to reduce such drawbacks associated with the process as mentioned above, and an object of the invention is to provide processes for preparing aromatic polycarbonates, by which polycarbonates having excellent heat resistance, water resistance, molding stability, and weathering resistance and, moreover, excellent stability when allowed in a molten state for an extended period of time can be obtained.

Further, the other object of the invention is to provide polycarbonate compositions having excellent properties as mentioned above.

SUMMARY OF THE INVENTION

The processes for preparing aromatic polycarbonates of the present invention are characterized by allowing aromatic dihydroxy compounds and carbonic acid diesters to undergo melt polycondensation in the presence of alkaline catalysts, and adding acid compounds to the reaction product as obtained.

In the processes of the invention mentioned above, it is desirable to add epoxy compounds together with the acid compound to the above-mentioned polycondensation reaction product.

Furthermore, in the above-mentioned processes of the invention, it is preferable to subject the above-mentioned polycondensation reaction product to pressure reducing treatment after addition of the acid compounds and, if necessary, the epoxy compounds to said reaction product.

According to the processes for preparing aromatic polycarbonates of the invention, there can be obtained aromatic polycarbonates excellent in heat resistance, water resistance, molding stability and weathering resistance and also excellent in stability when allowed to stand in a molten state for an extended period of time, because the acid compounds are added to the reaction product resulting from melt polycondensation. The alkali metal compounds and/or alkaline earth metal compounds contained in the alkaline catalysts remaining in the resulting polycarbonates are neutralized or weakened thereby. Accordingly the aforesaid adverse influences on properties of polycarbonate can be inhibited.

Further when the epoxy compounds are added to the reaction product, the epoxy compounds react with any excessively added acid compounds to neutralize them. Accordingly any further adverse influences can be inhibited.

Still further, in a case where the reaction product is subjected to pressure reducing treatment, the content of residual monomers or oligomers can be reduced, and accordingly contamination at the time of molding can be minimized and the resulting polycarbonate is excellent in heat resistance, water resistance and molding stability.

The aromatic polycarbonate composition of the present invention comprises (i) an aromatic polycarbonate obtained by allowing aromatic dihydroxy compounds and carbonic acid diesters to undergo melt polycondensation in the presence of an alkaline catalyst, (ii) an acid compound and optionally (iii) an epoxy compound.

The polycarbonate composition of the present is excellent in above-mentioned properties.

DETAILED DESCRIPTION OF THE INVENTION

The processes for preparing aromatic polycarbonates of the present invention is illustrated below in detail.

Starting compounds used for preparing aromatic polycarbonates of the invention are aromatic dihydroxy compounds and carbonic acid diesters.

The aromatic dihydroxy compounds used in the invention, though not particularly limited, includes such compounds as represented by the following formula (I).

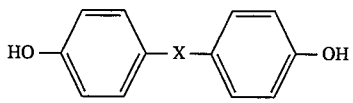

wherein X is

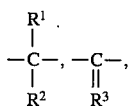

—O—,—S—,—SO— or —SO$_2$, and R$^1$ and R$^2$ are each a hydrogen atom or a monovalent hydrocarbon group, R$^3$ is a divalent hydrocarbon group, and the aromatic nucleus may have a monovalent hydrocarbon group. Further, these aromatic dihydroxy compounds include also the compounds of the above-mentioned formula (I) in which the phenyl group has been substituted with an aliphatic group or a halogen group.

Concrete examples of such aromatic dihydroxy compounds as mentioned above include bis(hydroxyaryl)alkanes such as bis(4-hydroxyphenyl)methane, 1,1-bis(4-hydroxyphenyl)ethane, 2,2-bis(4-hydroxyphenyl)propane,2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 2,2-bis(4-hydroxy-3-methylphenyl)propane, 1,1-bis(4-hydroxy-3-t-butyl-phenyl)propane, 2,2-bis(4-hydroxy-3-bromophenyl)propane, 2,2-bis(4-hydroxy-3,5-dimethylphenyl)propane;

bis(hydroxyaryl)cycloalkanes such as 1,1-bis(4-hydroxyphenyl)cyclopentane and 1,1-bis(4-hydroxyphenyl)cyclohexane;

dihydroxyaryl ethers such as 4,4'-dihydroxydiphenyl ether and 4,4'-dihydroxy-3,3'-dimethylphenyl ether; dihydroxydiarly sulfides such as 4,4'-dihydroxydiphenyl sulfide, and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone.

Of these aromatic dihydroxy compounds as exemplified above, particularly preferred is 2,2-bis (4-hydroxyphenyl)propane (bisphenol-A).

Concrete examples of the carbonic acid diester useful in the invention include diphenyl carbonate, ditolyl carbonate, bis(chlorophenyl)carbonate, m-cresyl carbonate, dinapthyl carbonate, bis(diphenyl)carbonate, diethyl carbonate, dimethyl carbonate, dibutyl carbonate and dicyclohexyl carbonate.

Of these carbonic acid diesters as exemplified above, particularly preferred is diphenyl carbonate.

These carbonic acid diesters mentioned above may contain dicarboxylic acid or dicarboxylic acid ester in an amount of preferably not more than 50 mol% and especially not more than 30 mol%. The dicarboxylic acid or dicarboxylic acid ester which may be used in that case includes terephthalic acid, isophthalic acid, sebacic acid, 1,10-decanedicarboxylic acid, 1,12-dodecanedicarboxylic acid, diphenyl terephthalate, diphenyl isophthalate, diphenyl sebacate, diphenyl decanedicarboxylate and diphenyl dodecanedicarboxylate, etc.

When such carboxylic acid or dicarboxylic acid ester as mentioned above is used in combination with the carbonic acid diester, polyesterpolycarbonate is obtained.

In preparing the polycarbonates of the invention, the above-mentioned carbonic acid diester is used desirably in an amount of 1.0–1.30 moles, preferably 1.01–1.20 moles and especially 1.01–1.10 moles based on one mole of the aromatic dihydroxy compound.

Further, in preparing the polycarbonates of the invention, a polyfunctional compound having in the molecule three or more functional groups may also be used in combination with the aromatic dihydroxy compound and carbonic acid diester.

The polyfunctional compound used in the invention includes preferably those having in the molecule not less than three phenolic hydroxyl or carboxyl groups, especially those having in the molecule three phenolic hydroxyl groups. Concretely, those polyfunctional compounds include, for example, 1,1,1-tris(4-hydroxyphenyl)ethane, α-methyl-α,α',α'-tris(4-hydroxyphenyl)-1,4-diethylbenzene,α,α',α"-tris(4-hydroxyphenyl)-1,3,5-triisopropylbenzene, phloroglycine, 4,6-dimethyl-2,4,6-tri(4-hydroxyphenyl)-heptane-2, 1,3,5-tri(4-hydroxyphenyl)benzene, 2,2'-bis-4,4-(4,4'-dihydroxyphenyl)cyclohexyl-propane, trimellitic acid, 1,3,5-benzenetricarboxylic acid and pyromellitic acid. of these polyfunctional compounds as exemplified above, preferably used are 1,1,1-tris(4-hydroxyphenyl)ethane, and αα',"-tris( 4-hydroxyphenyl)-1,3,5-triisopropylbenzene.

The polyfunctional compounds are desirably used in an amount of usually not more than 0.03 mole, preferably 0.001–0.02 mole and especially 0.002–0.01 mole based on one mole of the aromatic dihydroxy compound.

In the processes for preparing the polycarbonates of the present invention, alkaline compound catalysts 10 are used when the desired polycarbonate is prepared by melt polycondensation of the aromatic dihydroxy compound with the carbonic acid diester and, if necessary, with the above-mentioned polyfunctional compound. Such alkaline compound used as the catalyst includes particularly alkali metal compounds and/or alkaline earth metal compounds.

These compounds as mentioned above are preferably used in the form of derivatives of alkali metals and alkaline earth metals, such as organic acid salts, inorganic acid salts, oxides, hydroxides, hydrides or alcoholates, and these derivatives may be used either singly or in combination.

Useful alkali metal compounds as mentioned above include concretely sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borohydride, lithium borohydride, sodium borophenolate, sodium benzoate, potassium benzoate, lithium benzoate, disodium hydrogenphosphate, dipotassium hydrogenphosphate, dilithium hydrogenphosphate, disodium, dipotassium and dilithium salts of bisphenol A and sodium, potassium and lithium salts of phenol.

Useful alkaline metal compounds as mentioned above include concretely calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, Strontium acetate, calcium stearate, barium stearate, magnesium stearate and strontium stearate.

These alkali metal or alkaline earth metal compounds exemplified above are used in an amount of not more than $10^{-4}$ mole, preferably $10^{-7}$–$10^{-5}$ mole, more preferably $10^{-7}$–$3\times10^{-6}$ mole, especially $10^{-7}$–$2\times10^{-6}$ mole based on mole of the aromatic hydroxy compounds.

The use of the alkali metal or alkaline earth metal compound in an amount of not more than $10^{-4}$ mole based on one mole of the aromatic dihydroxy compound results in the maintenance of polymerization activity and, at the same time, the addition thereto of an acid compound (mentioned later) in such an amount that no properties of polycarbonate are adversely affected results in a sufficient neutralization or weakening of basicity exhibited by the alkali metal or alkaline earth metal compound, whereby the resulting polycarbonate is found to be excellent in hue, heat resistance, water resistance, and weathering resistance, and also excellent in long-term stability when it is preserved in a molten state.

In a case where the amount of the alkali metal or alkaline earth metal compound is more than $10^{-4}$ mole based on one mole of the aromatic dihydroxy compound, polycarbonates having excellent heat resistance, water resistance and molding stability become to be difficult to obtain even if the alkali metal or alkaline earth metal compound is neutralized.

In the present invention, it is also possible to use as the catalyst other basic compounds and boric acid compounds together with the above-mentioned alkaline compounds.

Useful basic compounds as mentioned above include, for example, nitrogen containing compounds which are easily decomposable or volatile at a high temperature, concretely ammonium hydroxides containing alkyl, aryl or alkaryl such as tetramethylammonium hydroxide ($Me_4NOH$), tetraethylammonium hydroxide ($Et_4NOH$), tetrabutylammonium hydroxide ($Bu_4NHO$) and trimethylbenzylammonium hydroxide

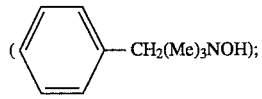

tertiary amines such as trimethylamine, triethylamine, dimethylbenzylamine and triphenylamine;

secondary amines represented by $R_2NH$ (in which R is alkyl such as methyl or ethyl; or aryl such as phenyl and toluyl);

primary amines represented by $R_2NH$ (in which R is as defined above);

imidazoles such as 2-methyl imidazole and 2-phenyl imidazole; or basic salts such as ammonia, tetramethylammonium borohydride ($Me_4NBH_4$), tetrabutylammonium borohydride ($Bu_4NBH_4$), tetrabutylammonium tetraphenylborate ($Bu_4NBPh_4$) and tetramethylammonium tetraphenylborate ($Me_4NBPh_4$).

Of these basic compounds as exemplified above, particularly preferred are tetraalkylammonium hydroxides especially tetraalkylammonium hydroxides for electrical use containing little metal contamination.

Useful boric acid compounds as the catalyst include boric acid and boric acid esters.

The boric acid esters used are those represented by the general formula $B(OR)n(OH)_{3-n}$ wherein R is arly such as methyl or ethyl, or aryl such as phenyl, and n is 1, 2 or 3.

Concrete examples of the boric acid esters mentioned above include trimethyl borate, triethyl borate, tributyl borate, trihexyl borate, triphenyl borate, tritolyl borate and trianaphthyl borate.

In the present invention, as mentioned above, it is preferable to use a catalyst comprising (a) the alkali metal compound and/or alkaline earth metal compound, and (b) a nitrogen containing basic compound.

In that case, (a) the alkali metal compound and/or alkaline earth metal compound is used in the amount as defined above, and (b) the nitrogen containing basic compound is used in an amount of $10^{-6}$—$10^{-1}$ mole, preferably $10^{-5}$–$10^{-2}$ mole based on one mole of the aromatic dihydroxy compound.

The use of (b) the nitrogen containing basic compound in an amount of $10^{-6}$–$10^{-1}$ mole based on one mole of the aromatic dihydroxy compound is preferred from the standpoint that the ester interchange reaction and polymerization reaction proceed at a sufficient rate to give the desired polycarbonate excellent in hue, heat resistance and water resistance. In this manner, the catalyst comprising a combination of (a) the alkali metal compound and/or alkaline earth metal compound and (b) the nitrogen containing basic compound has a high polymerization activity and is capable of forming a high molecular weight polycarbonate and, moreover, the polycarbonate obtained thereby is excellent in heat resistance and water resistance and, moreover, has improved hue and excellent transparency.

The catalysts used preferably in the present invention are those comprising (a) the alkali metal compounds and/or alkaline earth metal compounds, and (b) boric acid or boric acid esters, and also those comprising (a) the alkali metal compounds and/or alkaline earth metal compounds, (b) the nitrogen containing basic compounds, and (c) boric acid or boric acid esters.

The alkali metal compounds (a) and alkaline earth metal compounds (b) as mentioned above are desirably used in the amount as defined above.

The boric acid or boric acid esters (c) are used in an amount of $10^{-8}$–$10^{-1}$ mole, preferably $10^{-7}$–$10^{-2}$ mole and especially $10^{-6}$–$10^{-4}$ mole based on one mole of the aromatic dihydroxy compound. The use of the boric acid or boric acid esters in an amount of $10^{-8}$–$10^{-1}$ mole based on one mole of the aromatic dihydroxy compound is preferred from the standpoint that a decrease in molecular weight of the resulting polycarbonate after heat ageing is hard to occur and, moreover, the polycarbonate obtained thereby is found to be excellent in hue, heat resistance and water resistance.

In particular, the catalysts comprising (a) the alkali metal compound or alkaline earth metal compound, (b) the nitrogen containing compound and (c) boric acid or boric acid ester have increased polymerization activity and are capable of forming high molecular weight polycarbonates and, moreover, the polycarbonates obtained thereby are excellent in heat resistance, water resistance, hue and transparency.

Polycondensation reaction of the aromatic dihydroxy compound with carbonic diester and, if necessary with the polyfunctional compound may be carried out under the same conditions as employed in the prior art polycondensation reaction of the aromatic dihydroxy compound with carbonic diester. Practically speaking, the first stage reaction between both reactants is carried out at a temperature of 80°–250° C., preferably 100°–230° C. and especially 120°–190° C. at ordinary pressure for 0–5 hours, preferably 0–4 hours and especially 0–3 hours. Subsequently, the reaction temperature is raised while reducing the pressure of the reaction system to continue the reaction of the aromatic dihydroxy compound with carbonic acid diester, and finally the polycondensation reaction of the aromatic dihydroxy compound with carbonic acid ester is carried out at a temperature of 240°–320° C. under a vacuum of not more than 5 mm Hg, preferably not more than 1 mm Hg.

The above-mentioned polycondensation reaction may be carried out either continuously or batchwise. The reactor used for the above-mentioned reaction may be of the tank, pipe or tower type.

In the processes for preparing aromatic polycarbonates of the present invention, to the reaction product obtained in the manner as mentioned above, that is, a polycarbonate, is added an acid compound.

In the present invention, moreover, to the reaction product obtained in the above-mentioned manner is added an epoxy compound together with the acid compound.

The acid compounds used in the invention may be either Lewis acid compounds, Bronsted acid compounds or ester of strong acids containing a sulfur atom so long as they are capable of neutralizing the alkaline compounds such as the alkali metal compounds and alkaline earth metal compounds used as the catalysts.

In particular, the Bronsted acid compounds have pKa of not more than 5, preferably not more than 3 as measured in an aqueous solution thereof at 25° C.

The use of the acid compounds exhibiting a value of pKa as defined above brings about such advantages that the alkali metals or alkaline metals used as the catalysts can be neutralized, and the resulting polycarbonate is stabilized.

Concrete examples of useful Lewis acid compounds include boron compounds such as $B(OPh)_3$, zinc borate and boron phosphate;

boric acid esters such as $B(OCH_3)_3$, $B(OEt)_3$ and $B(OPh)_3$;

aluminum compounds such as aluminum stearate and aluminum silicate;

zirconium compounds such as zirconium carbonate, zirconium alkoxide and zirconium hydroxycarboxylate;

gallium compounds such as gallium phosphide and gallium antimonide;

germanium compounds such as germanium oxide and organogermanium compounds;

tin compounds such as tetra- and hexaorganotin,

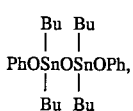

antimony compounds such as $Sb_2O_3$, antimony oxide and alkylantimony;

bismuth compounds such as bismuth oxide and alkylbismuth;

zinc compounds such as $(CH_3COO)_2Zn$ and zinc stearate; and titanium compounds such as alkoxytitanium and titanium oxide. In the above-mentioned formulas, Ph represents a phenyl group, Et represents an ethyl group, and Bu represents a butyl group.

Concrete examples of useful Bronsted acid compounds include phosphoric acid, phosphorous acid, hypophosphorous acid, pyrophosphoric acid, poly-phosphoric acid, boric acid, hydrochloric acid, hydrobromic acid, sulfuric acid, sulfurous acid, adipic acid, azelaic acid, dodecanoic acid, L-ascorbic acid, aspartic acid, benzoic acid, formic acid, acetic acid, citric acid, glutamic acid, salicyclic acid, nicotic acid, fumaric acid, maleic acid, oxalic acid, benzene-sulfinic acid, toluenesulfinic acid, and sulfonic acids such as benzenesulfonic acid, p-toluenesulfonic acid, trifluoromethane sulfonic acid, napthalene sulfonic acid, sulfonated polystyrene, and methyl acrylate-sulfonated styrene copolymer.

Concrete examples of useful ester of strong acids containing a sulfur atom include compounds comprising an acid residue having pKa of not more than 3 such as dimethyl sulfonate, diethyl sulfonate, methyl, ethyl, butyl, octyl or phenyl ester of p-toluenesulfonic acid, and methyl, ethyl, butyl, octyl or phenyl ester of benzenesulfonic acid.

Of these acid compounds as exemplified above, preferred are those having sulfur atom or phosphorous atom, particularly those containing sulfur atom.

These acid compounds may be used either singly or in combination.

The acid compounds to be added to the reaction product obtained as a polycarbonate are used in such an amount that adverse influences on polycarbonate of the alkaline metal compound and/or alkaline earth metal compound remaining in the polycarbonate obtained can be neutralized or weakened. For example, the acid compounds are used in an amount of 0.01–500 moles, preferably 0.1–100 moles, more preferably 0.1–50 moles and especially 0.5–30 moles based on one mole of the alkaline compound remaining in the polycarbonate obtained.

In particular, when the acid compound to be added is a Lewis acid or Bronsted acid having pKa of larger than 3, the amount of the acid compound used is 0.01–500 moles, preferably 0.1–50 moles and especially 0.1–30 moles, and when the acid compound to be added is a Bronsted acid having pKa of not more than 3 or the ester of strong acid containing a sulfur atom, the amount of the acid compound used is 0.01–500 moles, preferably 0.1–15 moles and especially 0.1–7 moles.

The epoxy compounds to be added in the present invention to the reaction product obtained as a polycarbonate are those having in the molecule at least one epoxy group, and the amount of the epoxy compound used, though not particularly limited, is usually 0.0001–0.2 part by weight, preferably 0.001–0.1 part by weight based on 100 parts by weight of the polycarbonate.

Concrete examples of useful epoxy compounds as mentioned above include epoxidized soybean oil, epoxidized linseed oil, phenylglycidyl ether, allylglycidyl ether, t-butylphenylglycidyl ether, 3,4-epoxycyclohexylmethyl 3,4-epoxycyclohexanecarboxylate, 3,4-epoxy-6-methylcyclohexylmethyl 3,4-epoxy-6-methylcyclohexanecarboxylate, 2,3-epoxycyclohexylmethyl 3,4-epoxycyclohexanecarboxylate, 4-(3,4-epoxy-5-methylcyclohexyl)butyl 3,4-epoxycyclohexanecarboxylate, 3,4-epoxycyclohexylethylene oxide, cyclohexylmethyl 3,4-epoxycyclohexanecarboxylate, 3,4-epoxy-6-methylcyclohexylmethyl-6-methyl cyclohexanecarboxylate, bisphenol-A diglycidyl ether, tetrabromobisphenol-A glycidyl ether, diglycidyl ester of phthalic acid, diglycidyl ester of hexahydrophthalic acid, bis-epoxydicyclopentadienyl ether, bis-epoxyethylene glycol, bis-epoxycyclohexyl adipate, butadiene diepoxide, tetraphenylethylene epoxide, octyl epoxyphthalate, epoxidezed polytutadiene, 3,4-dimethyl -1,2-epoxychlorohexane, 3,5-dimethyl-1,2-epoxycyclohexane, 3-methyl-5-t-butyl-1,2-epoxycyclohexane, octadecyl-2,2-dimethyl-3,4-epoxycyclohexane carboxylate, N-butyl-2,2-dimethyl-3,4-epoxycyclohexane carboxylate, cyclohexyl-2-methyl-3,4-epoxycyclohexane carboxylate, N-butyl-2-isopropyl-3,4-epoxy-5-methylcyclohexane carboxylate, octadecyl-3,4-epoxy;cyclohexane carboxylate, 2-ethylhexyl-3',4'- epoxycyclohexane carboxylate, 4,6-dimethyl-2,3-epoxycyclohexyl-3',4'epoxycyclohexane carboxylate, 4,5-epoxytetrahydrophthalic anhydride, 3-t-butyl-4,5-epoxytetrahydrophthalic anhydride, diethyl 4,5-epoxy -cis-1,2-cyclohexanedicarboxylate and di-n-butyl-3-t-butyl-4,5-epoxy-cis-1,2-cyclohexane dicarboxylate, and these epoxy compounds may be used either singly or in admixture of two or more.

If the epoxy compounds are added to the reaction product together with the acid compounds, the epoxy compounds react with the residual acid compounds, and accordingly the resulting polycarbonate is excellent in heat resistance, water resistance and hue.

In the processes for preparing aromatic polycarbonates of the present invention, the way of adding the acid compound and, if necessary, the epoxy compound to a polycarbonate obtained as the reaction product is not particularly limited to specific ones. For example, the acid compound and, if necessary, the epoxy compound may be added to the polycarbonate in a molten state, followed by kneading, or may be added to a solution of the polycarbonate, followed by stirring.

Concretely speaking, there are typical ways of adding the acid compound and epoxy compound to the polycarbonate obtained as the reaction product, for example, that which comprises adding, either separately or simultaneously, the acid compound and, if necessary, the epoxy compound to the polycarbonate obtained in a molten state in the reactor or extruder after the completion of the polycondensation reaction, followed by kneading, that which comprises pelletizing the polycarbonate, and feeding the pellets together with the acid compound and, if necessary, the epoxy compound, to a single screw or double-screw extruder, followed by melt kneading, and that which comprises dissolving the polycarbonate obtained in a appropriate solvent, for example, methylene chloride, chloroform or tetrahydrofuran, to prepare a solution, and adding, either separately or simultaneously, the acid compound and, if necessary, the epoxy compound, to the solution, followed by stirring.

To the polycarbonate as obtained are added the acid compound and epoxy compound in that order, and this order may also be reversed.

In the present invention, the polycarbonate obtained may be loaded, in addition to the acid compound and epoxy compound, with ordinary heat stabilizers, Tinuvin type ultraviolet absorbers, mold release agents, antistatic agents, slip agents, antiblocking agents, lubricants, anti-fogging agents, dyes, pigments, natural oil, synthetic oil, wax, organic fillers and inorganic fillers in such amounts that no object of the invention is marred.

The above-mentioned heat stabilizers include concretely, for example, phenol type stabilizers, organic thioether type stabilizers, organic phosphite type stabilizers, hindered amine type stabilizers and epoxy type stabilizers.

The phenol type stabilizers include, for example, n-octadecyl-3-(4-hydroxy-3',5'-di-t-butylphenyl)propionate, tetrakis methylene-3-(3'5'-di-t-butyl-4-hydroxyphenyl)propionate methane, 1,1,3-tris(2-methyl-4-hydroxy-5-t-butylphenyl)butane, distearyl (4-hydroxy-3-methyl-5-t-butyl)benzylmalonate and 4-hydroxymethyl-2,6-di-t-butylphenol, and these stabilizers may be used either singly or in admixture of two or more.

The thio ether type stabilizers include, for example, dilauryl thiodipropionate, disteararyl thiodipropionate, dimyristyl-3,3'-thiodipropionate and ditridecyl-3,3'-thiodipropionate, pentaerylthritol-tetrakis-(B-lauryl-thiopropionate), and these stabilizers may be used either singly or in admixture of two or more.

The phosphorous type stabilizers include, for example, arylalkyl phosphites such as bis(2,4-di-t-butylphenyl)pentaerythritol disphosphite, diphenyldecyl phosphite, diphenylisooctyl phosphite, phenylisooctyl phosphite and 2-ethylhexyldiphenyl phosphite;

trialkyl phosphites such as trimethyl phosphite, triethyl phosphite, tributyl phosphite, trioctyl phosphite, trinonyl phosphite, tridecyl phosphite, trioctadecyl phosphite, distearylpentaerylthritol diphosphite, tris(2-chloroethyl)phosphite and tris(2,3-dichloropropyl)phosphite;

tricycloalkyl phosphites such as tricyclohexyl phosphite;

triaryl phosphites such as triphenyl phosphite, tricresyl phosphite, tris(ethylphenyl)phosphite, tris(2,4-di-t-butylphenyl)phosphite, tris(nonylphenyl)phosphite and tris(hydroxyphenyl)phosphite;

trialkyl phosphates such as trimethyl phosphate, triethyl phosphate, tributyl phosphate, trioctyl phosphate, tridecyl phosphate, trioctadecyl phosphate, distearylpentaerythritol dihosphate, tris(2-chloroethyl) phosphate and tris (2,3-dichloropropyl) phosphate tricycloalkyl phosphates such as tricyclohexyl phosphate; and triaryl phosphates such as triphenyl phosphate, tricresyl phosphate, tris(nonylphenyl)phosphate and 2-ethylphenyldiphenyl phosphate, and these stabilizers may be used either singly or in admixture of two or more.

The hindered amine type stabilizers include, for example, bis(2,2,6,6-tetramethyl-4-piperidyl)sebacate, bis(1,2,2,6,6-pentamethyl-4-piperidyl)sebacate, 1-[2-[3-(3,5-di-t-butyl-4-hydroxyphenyl)propionyloxy)ethyl]-4-[3-(3,5-di-t-butyl-4-hydroxyphenyl)propionyloxy]-2,2,6,6-tetramethylpiperidine, 8-benzyl-7,7,9,9-tetramethyl-3-octyl-1,2,3-triazaspiro[4,5]undecane-2,4-dione, 4-benzoyloxy-2,2,6,6-tetramethylpiperidine,- 2-(3,5-di-t-butyl-4-hydroxybenzyl)-2-n-butylmalonic acid bis(1,2,2,6,6-pentamethyl-4-piperidyl) and tetrakis (2,2,6,6-tetramethyl-4-piperidyl 1,2,3,4-butanetetracarboxylate, and these stabilizers may be used either singly or in admixture of two or more.

These heat stabilizers as exemplified above are desirably used in an amount, based on 100 parts by weight of the polycarbonate, of 0.001–5 parts by weight, preferably 0.005–0.5 part by weight and especially 0.01–0.3 part by weight.

The above-mentioned heat stabilizers may be added, either in the form of solid or liquid, to the polycarbonate.

The addition to the polycarbonate of the heat stabilizers is carried out desirably during a period of time at which said polycarbonate is still in a molten state between a final polymerization reactor and a pelletizer, with the result that the number of heat histories to which the polycarbonate is subjected is lessened. Further, the polycarbonate containing the heat stabilizers can be inhibited to undergo thermal decomposition at the time when said polycarbonate is extrusion molded or pelletized by heating.

Where the above-mentioned heat stabilizers are added to the polycarbonate, ultraviolet absorbers may also be added simultaneously therewith. Such ultra-violet absorbers as used herein are not limited to particular ones but may be those commonly used, for example, salicyclic acid type ultraviolet absorbers, benzophenone type ultraviolet absorbers, benzotriazole type ultraviolet absorbers and cyanoacrylate type ultraviolet absorbers.

The salicyclic acid type ultraviolet absorbers include concretely phenyl salicylate and p-t-butylphenyl salicylate.

The benzophenone type ultraviolet absorbers include 2,4-dihydroxybenzophenone, 2-hydroxy-4-methoxybenzophenone, 2,2'-dihydroxy-4-methoxybenzophenone, 2,2'-dihydroxy, 4,4-dimethoxybenzophenone, 2-hydroxy-4-methoxy-2'-carboxybenzophenone, 2-hydroxy-4-methoxy-5-sulfobenzophenone trihydrate, 2-hydroxy-4-n-octoxybenzophenone, 2,2',4,4'-tetrahydroxy -benzophenone, 4-dodecyloxy-2-hydroxybenzophenone, bis(5-benzoyl-4-hydroxy-2-methoxyphenyl)methane and 2-hydroxy-4-methoxybenzophenone-5-sulfonic acid.

The benzotriazole type ultraviolet absorbers include 2-(2'-hydroxy-5'-methyl-phenyl) benzotriazole, 2-(2'-hydroxy-3', 5'-di-t-butyl-phenyl)benzotriazole, 2-(2'-hydroxy-3't-butyl-5'-methyl-phenyl)-5-chlorobenzotriazole, 2-(2'-hydroxy-3', 5'-t-butyl-phenyl)-5-chlorobenzotriazole, 2-(2'-hydroxy-5't-octylphenyl)benzotriazole, 2-(2'-hydroxy-3',5'-di-t-amylphenyl)benzotriazole, 2-[2'-hydroxy-3'-(3",4",5",6"-tetrahydrophthalimido-ethyl)-5'-methylphenyl] benzotriazole and 2,2'-methylenebis [4-(1,1,3,3-tetramethylbutyl)-6-(2H-benzotriazole-2-yl)phenol].

The cyanoacrylate type ultraviolet absorbers include 2-ethylhexyl-2-cyano-3,3-diphenyl acrylate and ethyl-2-cyano-3,3-diphenyl acrylate.

The ultraviolet absorbers as exemplified above may be used either singly or in admixture of two or more. These ultraviolet absorbers are used in an amount, based on 100 parts by weight of the polycarbonate, of usually 0.001–5 parts by weight, preferably 0.005–1.0 part by weight and especially 0.01–0.5 part by weight.

In the present invention, mold release agents may be added to the polycarbonate simultaneously with the addition of the above-mentioned heat stabilizers. Such mold release agents as may be used are not limited to particular ones but may be those commonly used, for example, hydrocarbon type releasants such as natural and synthetic paraffins, and polyethylene waxes and fluorocarbons; fatty acid type releasants such as higher fatty acide, e.g. stearic acid and hydroxy-stearic acid; fatty acid amide type releasants such as fatty acid amides, e.g. stearic acid amide and ethylenebisstearoamide, and alkylenebis fatty acid amides; alcohol type releasants such as aliphatic alcohol, e.g. stearyl alcohol and cetyl alcohol, and polyhydric alcohol, polyglycol and polyglycerols; fatty acid ester type releasants such as lower alcohol of fatty acid, e.g. butyl stearate and pentaerythritol tetrastearate, and polyhydric alcohol esters of fatty acid and polyglycol esters of fatty acid; and silicone type releasants such as silicone oils.

These releasants as exemplified above may be used either singly or in admixture of two or more. The releasants are used in an amount, based on 100 parts by weight of the polycarbonate, of usually 0.001–5 parts by weight, preferably 0.005–1 part by weight and especially 0.01–0.5 part by weight.

Furthermore, colorants may also be added to the polycarbonate simultaneously with the addition of the above-mentioned heat stabilizers. Such colorants as may be used herein may be either pigments or dyes, and any of inorganic and organic colorants may be used either singly or in combination.

The inorganic colorants include concretely oxides such as titanium dioxide and iron oxide red; hydroxides such as alumina white; sulfides such as zinc sulfide; selenides and ferrocyanides such as Prussian blue; chromates such as zinc chromoate and molybdenum red; sulfates such as barium sulfate; carbonates such as calcium carbonate; silicates such as ultramarine blue; phosphates such as manganese violet; carbons such as carbon black and metallic powder colorants such as bronze powder and aluminum powder.

The organic colorants include concretely nitroso colorants such as Napthol Green B; nitro colorants such as Napthol Yellow S; azo colorants such as lysol red, Bordeaux 10B, Naphthol Red and Chromophthal Yellow, phthalocyanine colorants such as Phthalocyanine Blue and Fast Sky Blue, and condensation polycyclic colorants such as Indanthrone Blue, quinacridone violet and dioxazine violet.

These colorants as exemplified above may be used either singly or in combination.

The colorants mentioned above are used in an amount, based on 100 parts by weight of the polycarbonate, of usually $1 \times 10^{-6}$–5 parts by weight, preferably $1 \times 10^{-5}$–3 parts by weight and especially $1 \times 10^{-5}$–1 part by weight.

In the present invention, the polycarbonate resulting from polycondensation reaction is desirably subjected, after addition thereto of the acid compound and, if necessary the epoxy compound, to pressure reducing treatment.

In practicing the pressure reducing treatment, either a reactor equipped with a pressure reducing device or an extruder equipped with a pressure reducing device may be used, though the treatment device is not limited specific ones.

The above-mentioned reactor used therefor may be either a vertical tank type reactor or a horizontal tank type reactor and preferably a horizontal tank type reactor may be used.

The pressure reducing treatment using the reactor mentioned above may be carried out at a pressure of 0.05–750 mm Hg, preferably 0.05–5 mm Hg.

The pressure reducing treatment using such an extruder as mentioned above is desirably carried out for about 10 seconds to 15 minutes, and said treatment using the above-mentioned reactor is desirably carried out for about 5 minutes to 3 hours. Further, the pressure reducing treatment is desirably carried out at a temperature of about 240°–350° C.

The extruder used in the pressure reducing treatment may be any of vented single screw or double-screw extruders, and the polycarbonate being treated may also be pelletized simultaneously.

The pressure reducing treatment may be carried out in the above-mentioned extruder at a pressure of 1–750 mm Hg, preferably 5–700 mm Hg.

The thus formed polycarbonate incorporated with the acid compound and if necessary with the epoxy compound is subjected to pressure reducing treatment, whereupon a polycarbonate in which the content of residual monomers or oligomers has been decreased is obtained. Accordingly, the resulting polycarbonate is excellent in residence stability at the time of molding thereof, and molded articles obtained therefrom are excellent in heat resistance, water resistance and weathering resistance. At the same time, the molded articles obtained therefrom are less in molding defect, because contamination at the time of the molding of the molded article is minimized. Furthermore, a relative frequency of replacement of the mold can also be decreased.

Still further, the molded articles provided by the use of the polycarbonates of the present invention retain highly stabilized hue thereof even when they are used for a long period of time.

The polycarbonates obtained in the present invention may be widely used for optical appliances such as sheets, lenses, CD disks, for outdoor appliances such as automobile parts and for housing of various instruments.

Then, the aromatic polycarbonate composition of the present invention is illustrated below.

The first aromatic polycarbonate composition of the present invention comprises (i) an aromatic polycarbonate obtained by allowing aromatic dihydroxy compounds and carbonic acid diesters to undergo melt polycondensation in the presence of an alkaline catalyst, and (ii) an acid compound.

The second aromatic polycarbonate composition of the present invention comprises (i) an aromatic polycarbonate obtained by allowing aromatic dihydroxy compounds and carbonic acid diesters to undergo melt polycondensation in the presence of an alkaline catalyst, (ii) an acid compound, and (iii) an epoxy compound.

The amount of the acid compound contained in the aromatic polycarbonate composition is 0.001–500 moles, preferably 0.1–100 moles, more preferably 0.1–50 moles and especially 0.1–7 moles based on one mole of the sum of the alkaline metal compound and/or alkaline earth metal compound as a catalyst.

The amount of the epoxy compound contained in the aromatic polycarbonate composition is 0.0001–0.2 part by weight, preferably 0.01–0.1 part by weight based on 100 parts by weight of the polycarbonate.

Further the aromatic polycarbonate composition of the present invention may contain the above-mentioned heat stabilizers, ultraviolet absorbers etc.

EFFECT OF THE INVENTION

In the processes for preparing polycarbonates of the present invention, the reaction product obtained by melt polycondensation reaction of an aromatic dihydroxy compound with a carbonic acid diester is incorporated with an acid compound and, if necessary, an epxoy compound. Hence it follows that an influence on properties of polycarbonate by the presence of a basic compound remaining in the resulting polycarbonate is neutralized or weakened. Accordingly, in accordance with the processes for preparing polycarbonates of the invention, there are prepared polycarbonates excellent in heat resistance, water resistance and weathering resistance and also excellent in stability even when they are held in a molten state for a long period of time, because adverse influences on properties of polycarbonate of this basic compound catalyst contained in the resulting polycarbonates can be inhibited.

The present invention is illustrated below with reference to examples, but it should be construed that the invention is in no way limited to those examples.

In the following examples, the polycarbonates obtained were tested for physical properties by the following procedure.

MFR (g/10 min): This was measured at a temperature of 300° C. and under a load of 1.2 kg in accordance with the method as stipulated in JIS K-7210.

Intrinsic viscosity (IV, dl/g): This was measured in methylene chloride at 20° C. using a Ubbelhode's viscometer.

Hue (YI): A plate of 3 mm in thickness obtained by injection molding at a cylinder temperature of 320° C., an injection molding pressure of 1000 kg/cm$^2$, 1 cycle of 45 seconds and a mold temperature of 90° C. was measured for X, Y and Z values by the permeation method using a color and color difference meter (ND-1001 DP, manufactured by Nihon Denshoku Kogyo K.K.) to obtain a yellowness index (YI) according to the following equation.

$$YI = \frac{100}{Y}(1.277X - 1.060Z)$$

Melt stability test (resistance stability): MFR and YI of a plate obtained by injection molding the polycarbonate maintained at 320° C. for 15 minutes in a cylinder of the injection molding machine were measured.

Light transmission (%): This was measured by using an injection molded plate of 3 mm in thickness in accordance with ASTM D 1003.

Haze: This was measured by using an injection molded plate of 3 mm in thickness by means of NDH-200 of Nihon Denshoku Kogyo K.K.

Water resistance: An injection molded plate for use in the measurement of hue was immersed in water in an autoclave, and was then retained in an oven at 125° C. for 5 days. Using this test specimen, the measurement of haze was conducted.

Injection molding machine: PS60-9ASE manufactured by Nissei Jushi Kogyo K.K. was used.

PREPARATIVE EXAMPLE 1

(Preparative Example of Polycarbonate)

A 250-liter tank type stirrer was charged with 0.44 kilo moles of bisphenol A (a product of Nippon GE Plastics Co., Ltd.) and 0.45 kilo moles of diphenyl carbonate, and the stirrer was substituted with nitrogen, followed by dissolving at 140° C.

Subsequently, the resulting solution was raised in temperature to 180° C., and 0.0011 mole of boric acid was added, followed by stirring for 30 minutes. To the solution were added as catalysts 0.11 moles of tetramethylammonium hydroxide and 0.00044 moles of sodium hydroxide, and the temperature was raised to 240° C. and, at the same time, the pressure was gradually decreased to 30 mm Hg. Holding the temperature and pressure constant, the amount of phenol distilled was measured, and the pressure was restored to an atmospheric pressure by means of nitrogen at the point where no more phenol distilled. The time necessary for carrying out the reaction was 2 hours. An intrinsic viscosity [η] of the reaction product obtained was 0.12 dl/g.

Subsequently, this reaction product was increased in pressure by means of a gear pump, fed into a centrifugal film evaporator, and the reaction was allowed to proceed. The temperature and pressure of the film evaporator were controlled so as to be maintained at 290° C. and 2 mm Hg, respectively.

Thus formed prepolymer withdrawn by means of a gear pump from the bottom of the evaporator was passed through a die in a nitrogen atmosphere into a strand, followed by cutting into pellets using a cutter. An intrinsic viscosity [η] of this prepolymer was 0.32 dl/g.

Thereafter, this prepolymer was fed by means of an extruder at a rate of 40 kg/hr into a double-screw stirring polymerizer (L/D=6, a diameter of a stirring blade of 150 mm, an internal volume of 40 liters) controlled so as to be maintained at 290° C. and 0.2 mm Hg, and polymerized for a residence time of 30 minutes. An intrinsic viscosity (IV) of the polymer obtained was 0.45 dl/g.

Example 1

Phosphorous acid ($H_3PO_3$) was added to the polycarbonate obtained in the Preparative Example in an amount of 5 times the molar quantity based on the amount of Na (0.09 ppm) contained in the polycarbonate, and the resulting mixture was kneaded at 280° C. by means of a single screw extruder of 40 mmø manufactured by Nikko, followed by pelletizing.

The resin thus prepared was tested for intrinsic viscosity (IV), MFR and hue (YI), and also tested for melt stability by keeping at 320° C. for 15 minutes.

Results obtained are shown in Table 1.

Examples 2–3

Example 1 was repeated except that the amount of phosphorous acid ($H_3PO_3$) added was varied.

Results obtained are shown in Table 1.

Examples 4–8

Example 1 was repeated except that in place of the phosphorous acid ($H_3PO_3$), acid compounds as shown in Table 1 were used in amounts as indicated in Table 1.

Comparative Example 1

Example 1 was repeated except that the phosphorous acid ($H_3PO_3$) was not added to the polycarbonate.

Results obtained are shown in Table 1.

Example 9

Example 1 was repeated except that 500 ppm of Irgaphos 168, a product of Ciba-Geigy, was additionally added to the polycarbonate.

Results obtained are shown in Table 2.

TABLE 2

|  | Example 9 |
|---|---|
| Acid compound | $H_3PO_3$ |
| mol ratio/NA+ | 3 |
| Stabilizer | Irgaphos 168 |
| amount (ppm) | 500 |
| Initial physical properties |  |
| IV (dl/g) | 0.45 |
| MFR (g/10 min) | 16.6 |
| YI | 1.80 |
| After melt stability test |  |
| MFR (g/10 min) | 16.9 |
| MFR rising ratio (%) | 1.8 |
| YI | 1.90 |

TABLE 1

|  | Ex. 1 | Ex. 2 | Ex. 3 | Ex. 4 | Ex. 5 |
|---|---|---|---|---|---|
| Acid compound | $H_3PO_3$ | $H_3PO_3$ | $H_3PO_3$ | $H_3PO_2$ | $CH_3-C_6H_4-SO_3H$ (mono hydrate) |
| pKa value in water at 25° C. | 1.5 | 1.5 | 1.5 | 1.2 | −7 (presumption) |
| mol ratio/Na+ | 5 | 3 | 1 | 3 | 3 |
| Initial physical properties |  |  |  |  |  |
| IV (dl/g) | 0.45 | 0.44 | 0.45 | 0.44 | 0.45 |
| MFR (g/10 min.) | 16.9 | 18.1 | 16.5 | 17.4 | 16.6 |
| YI | 2.05 | 2.02 | 2.13 | 2.12 | 2.53 |
| After melt stability test |  |  |  |  |  |
| MFR (g/10 min.) | 18.5 | 21.3 | 19.3 | 21.8 | 18.4 |
| MFR rising ratio (%) | 9.5 | 17.7 | 17.0 | 25.3 | 10.8 |
| YI | 2.28 | 2.12 | 2.23 | 2.34 | 2.62 |
| Water resistance (Haze) | 15.5 | 10.5 | 5.4 | 8.5 | 11.0 |

|  | Ex. 6 | Ex. 7 | Ex. 8 | Comp. Ex. 1 |
|---|---|---|---|---|
| Acid compound | $B(O-C_6H_5)_3$ | $B(O-C_6H_5)_3$ | $CH_3-C_6H_4-SO_3Bu$ | None |
| pKa value in water at 25° C. | — | — | −7 (Presumption) | — |
| mol ratio/Na | 20 | 10 | 3 | — |
| Initial physical properties |  |  |  |  |
| IV (dl/g) | 0.45 | 0.45 | 0.45 | 0.45 |
| MFR (g/10 min.) | 17.1 | 17.3 | 16.7 | 20.6 |
| YI | 2.36 | 2.38 | 1.95 | 2.35 |
| After melt stability test |  |  |  |  |
| MFR (g/10 min.) | 17.7 | 17.3 | 18.3 | 27.1 |
| MFR rising ratio (%) | 3.5 | 0 | 9.6 | 31.6 |
| YI | 3.03 | 3.37 | 2.00 | 3.20 |
| Water resistance (Haze) | 20.8 | 18.8 | 7.0 | 2.5 |

Example 10

A 250-liter tank type stirrer was charged with 0.44 kilo moles of bisphenol A (a product of Nippon GE Plastics Co., Ltd.) and 0.455 kilo moles of diphenyl carbonate (a product of Eni), and the stirrer was substituted with nitrogen, followed by melting at 140° C.

Subsequently, the resulting solution was raised in temperature to 180° C., and 0.011 mole of boric acid was added, followed by stirring for 30 minutes. To the solution were added as catalysts 0.11 moles of tetramethylammonium hydroxide and 0.00044 moles of sodium hydroxide, and the temperature was raised to 240° C. and, at the same time, the pressure was gradually decreased to 30 mm Hg. Holding the temperature and pressure constant, the amount of phenol distilled was measured, and the pressure was restored to an atmospheric pressure by means of nitrogen at the point where no more phenol distilled. The time necessary for carrying out the reaction was 2 hours. An intrinsic viscosity [η] of the reaction product obtained was 0.12 dl/g.

Subsequently, this reaction product was increased in pressure by means of a gear pump, fed into a centrifugal film evaporator, and the reaction was allowed to proceed. The temperature and pressure of the film evaporator were controlled so as to be maintained at 290° C. and 2 mm Hg, respectively.

Thereafter, this prepolymer was fed by means of an extruder at a rate of 40 kg/hr into a double-screw stirring polymerizer (L/D=3, a diameter of a stirring blade of 220 mm, an internal volume of 80 liters) controlled so as to be maintained at 290° C. and 0.2 mm Hg, and polymerized for a residence time of 30 minutes. An intrinsic viscosity (IV) of the polymer obtained was 0.45 dl/g.

Phosphorous acid in an amount of 3 times the molecular quantity based on the amount of Na (0.09 ppm) contained in the polycarbonate and 50 ppm of 3,4-epoxycyclohexylmethyl 3,4-epoxycyclohexanecarboxylate as the epoxy compound were added to the polycarbonate thus obtained, and the mixture was kneaded at 290° C. by means of a single screw extruder of 40 mmø manufactured by Nikko, followed by pelletizing.

Results obtained are shown in Table 3.

Examples 11–15, Comparative Examples 2

Example 10 was repeated except that in place of the phosphorous acid and 3,4-epoxycyclohexylmethyl 3,4-epoxycyclohexanecarboxylate, acid compounds and epoxy compounds as shown in Table 3 were used in amounts as indicated in Table 3.

Results obtained are shown in Table 3.

Example 16

Example 13 was repeated except that stabilizers as shown in Table 4 were additionally added in amounts as indicated in Table 3 to the polycarbonate.

Results obtained are shown in Table 3.

Comparative Example 3

Example 16 was repeated except that the stabilizers as shown in Table 4 in the amounts as indicated in Table 3 were added to the polycarbonate but no acid compound and no epoxy compound were added thereto.

Results obtained are shown in Table 3.

TABLE 3

|  | Ex. 10 | Ex. 11 | Ex. 12 | Ex. 13 | Ex. 14 | Ex. 15 | Compar. Ex. 2 |
|---|---|---|---|---|---|---|---|
| Acid compound | Phosphorous acid | Benzensulfonic acid (mono hydrate) | p-Toluenesulfonic acid (mono hydrate) | Methyl p-Toluenesulfonate | p-Toluenesulfonic acid (mono hydrate) | p-Toluenesulfonic acid (mono hydrate) | — |
| $pKa$ in water at 25° C. | 1.5 | −7 | −7 (presumption) | — | −7 (presumption) | −7 (presumption) | — |
| Amount (mol ratio/$Na^+$) | 3 | 2 | 1 | 2 | 2 | 2 | 0 |
| Epoxy compound | Compound of *1 | Epoxidized linseed oil of *2 | Compound of *1 | Compound of *1 | Compound of *1 | — | — |
| Amount (wt part/polycarbonate 100 wt parts) | 0.005 | 0.02 | 0.02 | 0.02 | 0.04 | 0 | 0 |
| Initial physical properties |  |  |  |  |  |  |  |
| IV (dl/g) | 0.45 | 0.44 | 0.45 | 0.45 | 0.44 | 0.45 | 0.45 |
| YI | 2.0 | 2.1 | 1.9 | 1.8 | 2.0 | 2.0 | 2.4 |
| Light transmission (%) | 90.8 | 90.8 | 90.9 | 90.8 | 90.7 | 90.7 | 90.6 |
| Haze | 0.4 | 0.3 | 0.3 | 0.3 | 0.4 | 0.4 | 0.5 |
| MFR (g/10 min.) | 17.0 | 17.5 | 16.9 | 16.8 | 17.6 | 16.9 | 17.2 |
| Residence stability |  |  |  |  |  |  |  |
| YI | 2.2 | 2.3 | 2.0 | 1.9 | 2.2 | 2.6 | 3.1 |
| MFR (g/10 min.) | 19.6 | 19.2 | 19.3 | 18.2 | 19.3 | 18.6 | 23.0 |
| MFR rising ratio (%) | 15.2 | 9.7 | 14.2 | 8.3 | 9.7 | 10.1 | 33.7 |
| Water resistance (Haze) | 12.0 | 6.2 | 4.8 | 6.0 | 5.5 | 23.5 | 4.0 |

|  | Example 16 | Compar. Ex. 3 |
|---|---|---|
| Acid compound | p-Toluenesulfonic acid (mono hydrate) | — |
| $pKa$ in water at 25° C. | −7 (presumption) | 0 |
| Amount (mol ratio/$Na^+$) | 2 | 0 |
| Epoxy compound | 3,4-Epoxycyclohexylmethyl 3,4-epoxycyclohexanecarboxylate | — |

TABLE 3-continued

| | | |
|---|---|---|
| Amount (wt part/polycarbonate 100 wt parts) | 0.05 | 0 |
| Stabilizer (wt part/polycarbonate 100 wt parts) | | |
| Ilgaphos-168 (Ciba-Geigy) | 0.05 | 0.05 |
| Mark AO-50 (Adeca Argus) | 0.05 | 0.05 |
| Thyasolve UV-5411 (Sunchemical) | 0.2 | 0.2 |
| Initial physical properties | | |
| IV (dl/g) | 0.44 | 0.44 |
| YI | 2.0 | 2.1 |
| Light transmission (%) | 90.7 | 90.6 |
| Haze | 0.4 | 0.5 |
| MFR (g/10 min) | 18.0 | 18.1 |
| Residence stability | | |
| YI | 2.1 | 2.4 |
| MFR (g/10 min) | 21.6 | 30.8 |
| MFR rising ratio (%) | 20 | 70.2 |
| Water resistance (Haze) | 6.5 | 80 |

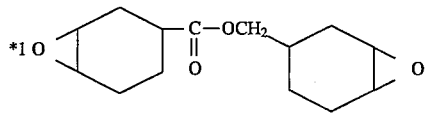

*2 Adeca Argus Co. ADK Design O-180

Example 17

A 250-liter tank type stirrer was charged with 0.44 kilo moles of bisphenol A (a product of Nippon GE Plastics Co., Ltd.) and 0.45 kilo moles of diphenyl carbonate (a product of Eni), and the stirrer was substituted with nitrogen, followed by dissolving at 40° C.

Subsequently, the resulting solution was raised in temperature to 180° C., followed by stirring for 30 minutes. To the solution were added as catalysts 0.11 moles of tetramethylammonium hydroxide and 0.00044 moles of sodium hydroxide, and the temperature was raised to 240° C. and, at the same time, the pressure was gradually decreased to 30 mm Hg. Holding the temperature and pressure constant, the amount of phenol distilled was measured, and the pressure was restored to an atmospheric pressure by means of nitrogen at the point where no more phenol distilled. The time necessary for carrying out the reaction was 2 hours. An intrinsic viscosity [η] of the reaction product obtained was 0.12 dl/g.

Subsequently, this reaction product was increased in pressure by means of a gear pump, fed into a centrifugal film evaporator, and the reaction was allowed to proceed. The temperature and pressure of the film evaporator were controlled so as to be maintained at 290° C. and 2 mm Hg, respectively.

Thereafter, this prepolymer was fed by means of an extruder into a double-screw stirring polymerizer (L/D=3, a diameter of a stirring blade of 220 mm, an internal volume of 80 liters) controlled so as to be maintained at 285° C. and 0.2 mm Hg, and polymerized for a residence time of 30 minutes.

Thus formed polymer was fed by means of a gear pump into a double-screw extruder (L/D=17.5, a barrel temperature 285° C.) and the polymer was kneaded with 0.05 parts by weight of Mark 2112E, 0.05 parts by weight of Mark AO-50, 0.3 parts by weight of Thyasolve UV5411, 0.3 parts by weight of TSF437, 0.05 parts by weight of Cerokiside 2021P, 0.00006 parts by weight of Plast Violet 8840 and 0.00017 parts by weight of ethyl p-toluensulfonate (2 times mole/Na mole in the polymer) based on 100 parts by weight of the polymer. The polymer was passed through a die into a strand, followed by cutting into pellets.

An intrinsic viscosity (IV) of the polymer obtained was 0.46 dl/g.

Results obtained are shown in Table 4.

TSF437: Mold release agent Toshiba Silicone Co. Ltd.

Cerokiside 2021P: an epoxy compound Daicel Chemical Co. Ltd. Alicyclic diepoxy carboxylate Plast Violet 8840: Colorant Arimoto Chemical Co. Ltd. Sulene type

Comparative Example 4

Example 17 was repeated except that the ethyl p-toluensulfonate was not added to the polycarbonate.

Results obtained are shown in Table 4.

Example 18

Example 16 was repeated except that 0.44 kilo moles of bisphenol A and 1.3 moles of 1,1,1-tris(4-hydroxyphenyl)ethane (0.3 mol %/bisphenol A) were used as the aromatic dihydroxy compound and aromatic trihydroxy compound, respectively. The double-screw horizontal stirring polymerizer was maintained at 302° C.

Results obtained are shown in Table 5.

Comparative Example 5

Example 18 was repeated except that both the acid compound and epoxy compound were not used.

Results obtained are shown in Table 5.

TABLE 4

| | Example 17 | Compar. Ex. 4 |
|---|---|---|
| Acid compound | Ethyl P-Toluene-sulfonate | — |
| Amount (mol ratio/Na+) | 2 | 0 |
| Epoxy compound | Cerokiside 2021P | Cerokiside 2021P |

TABLE 4-continued

|  | Example 17 | Compar. Ex. 4 |
|---|---|---|
| Amount (wt part/polycarbonate 100 wt parts) | 0.05 | 0.05 |
| Additives (wt part/polycarbonate 100 wt parts) | | |
| Mark 2112E | 0.05 | 0.05 |
| Mark AO-50 | 0.05 | 0.05 |
| Thyasolve UV5411 | 0.3 | 0.3 |
| TSF 437 | 0.3 | 0.3 |
| Plast Violet 8840 | 0.00006 | 0.00006 |
| Initial physical properties | | |
| IV (dl/g) | 0.46 | 0.46 |
| YI | 0.40 | 0.50 |
| Light transmission (%) | 89.9 | 89.7 |
| Haze | 0.3 | 0.4 |
| MFR (g/10 min) | 15.0 | 15.1 |
| Residence stability | | |
| YI | 0.75 | 1.5 |
| MFR (g/10 min) | 15.9 | 25.5 |
| MFR rising ratio (%) | 6.0 | 68.8 |
| Water resistance (Haze) | 4.6 | 8.6 |

TABLE 5

|  | Example 18 | Compar. Ex. 5 |
|---|---|---|
| Acid compound | P-Toluenesulfonic acid (mono hydrate) | — |
| pKa in water at 25° C. | −7 (presumption) | 0 |
| Amount (mol ratio/Na$^+$) | 2 | 0 |
| Epoxy compound | 3,4-Epoxycyclohexylmethyl 3,4-epoxycyclohexanecarboxylate | — |
| Amount (wt part/polycarbonate 100 wt parts) | 0.05 | 0 |
| Stabilizer (wt part/polycarbonate 100 wt parts) | | |
| Ilgaphos-168 (Ciba-Geigy) | 0.05 | 0.05 |
| Mark AO-50 (Adeca Argus) | 0.05 | 0.05 |
| Thyasolve UV-5411 (Sunchemical) | 0.2 | 0.2 |
| Initial physical properties | | |
| IV (dl/g) | 0.52 | 0.52 |
| YI | 2.0 | 2.2 |
| Light transmission (%) | 90.7 | 90.6 |
| Haze | 0.3 | 0.5 |
| MFR (g/10 min) | 5.0 | 5.1 |
| Residence stability | | |
| YI | 2.2 | 2.6 |
| MFR (g/10 min) | 5.9 | 8.2 |
| Rate of increase in MFR (%) | 18.0 | 60.8 |
| Water resistance (Haze) | 5.8 | 83 |

PREPARATIVE EXAMPLE 2

A 250-liter tank type stirrer was charged with 0.44 kilo moles of bisphenol A ( a product of Nippon GE Plastics Co., Ltd.) and 0.46 kilo moles of diphenyl carbonate (a product of Eni), and the stirrer was substituted with nitrogen, followed by dissolving at 140° C.

Subsequently, the resulting solution was raised in temperature to 180° C., and 0.011 mole of boric acid was added, followed by stirring for 30 minutes. To the solution were added as catalysts 0.11 moles of tetramethylammonium hydroxide and 0.00044 moles of sodium hydroxide, and the temperature was raised to 240° C. and, at the same time, the pressure was gradually decreased to 30 mm Hg. Holding the temperature and pressure constant, the amount of phenol distilled was measured, and the pressure was restored to an atsmopheric pressure by means of nitrogen at the point where no more phenol distilled. The time necessary for carrying out the reaction was 2 hours. An intrinsic viscosity [η] of the reaction product obtained was 0.12 dl/g.

Subsequently, this reaction product was increased in pressure by means of a gear pump, fed into a centrifugal film evaporator, and the reaction was allowed to proceed. The temperature and pressure of the film evaporator were controlled so as to be maintained at 270° C. and 2 mm Hg, respectively.

Thereafter, this prepolymer was fed by means of an extruder at a rate of 40 kg/hr into a double-screw stirring polymerizer (L/D=3, a diameter of a stirring blade of 220 mm, an internal volume of 80 liters) controlled so as to be maintained at 270° C. and 0.2 mm Hg, and polymerized for a residence time of 30 minutes.

An intrinsic viscosity (IV) of the polymer obtained was 0.36 dl/g. An amount of Na contained in the polymer was 0.09 ppm.

PREPARATIVE EXAMPLE 3

A 250-liter tank type stirrer was charged with 0.44 kilo moles of bisphenol A (a product of Nippon GE Plastics Co., Ltd. ) and 0.45 kilo moles of diphenyl carbonate (a product of Eni), and the stirrer was substituted with nitrogen, followed by melting at 140° C.

Subsequently, the resulting solution was raised in temperature to 180° C., and 0.0011 mole of boric acid was added, followed by stir-ring for 30 minutes. To the solution were added as catalysts 0.11 moles of tetramethylammonium hydroxide and 0.00044 moles of sodium hydroxide, and the temperature was raised to 240° C. and, at the same time, the pressure was gradually decreased to 30 mm Hg. Holding the temperature and pressure constant, the amount of phenol distilled was measured, and the pressure was restored to an atmospheric pressure by means of nitrogen at the point where no more phenol distilled. The time necessary for carrying out the reaction was 2 hours. An intrinsic viscosity [η] of the reaction product obtained was 0.12 dl/g.

Subsequently this reaction product was increased in pressure by means of a gear pump, fed into a centrifugal film evaporator, and the reaction was allowed to proceed. The temperature and pressure of the film evaporator were controlled so as to be maintained at 295° C. and 2 mm Hg, respectively.

Thereafter, this prepolymer was fed by means of an extruder at a rate of 40 kg/hr into a double-screw stirring polymerizer (L/D=3, a diameter of a stirring blade of 220 mm, an internal volume of 80 liter) controlled so as to be maintained at 300° C. and 0.2 mm Hg, and polymerized for a residence time of 30 minutes. An intrinsic viscosity (IV) of the polymer obtained was 0.54 dl/g. An amount of Na contained in the polymer was 0.09 ppm.

Example 19

To the polycarbonate obtained in Preparative Example 2 was added phosphorous acid ($H_3PO_3$) in an amount of three times the molar quantity based on the amount of Na (0.09 ppm) contained in the polycarbonate, and the resulting mixture was subjected to pressure reducing treatment for removing low boiling matters such as residual monomers from the polycarbonate using the same type double-screw horizontal stirring polymerizer as used in Preparative Example 2 by stirring the mixture for 15 minutes at 300° C. and 0.2 mm Hg.

Results obtained are shown in Table 6.

Examples 20–22

Example 19 was repeated except that polycarbonates and acid compounds as shown in Table 6 were used in amounts as indicated in Table 6.

Results obtained are shown in Table 6.

Example 23

Example 22 was repeated except that the pressure reducing treatment was carried out using a double-screw bent extruder (L/D=42, 40 mmø) operated at a reduced pressure of 30 mm Hg and a barrel temperature of 295° C.

Results obtained are shown in Table 6.

Example 24

Example 19 was repeated except that an epoxy compound (Cerokiside 2021P) was also added together with phosphorous acid in an amount of 0.02 part by weight based on 100 parts by weight of the polycarbonate.

Results obtained are shown in Table 6.

Example 25

Example 22 was repeated except that an epoxy compound (Cerokiside 2021P) was also added together with p-toluensulfonic acid in an amount of 0.01 part by weight based on 100 parts by weight of the polycarbonate.

Results obtained are shown in Table 6.

Comparative Examples 6–7

Physical properties of the polycarbonate resins obtained respectively in Examples 19 and 21 were measured.

Results obtained are shown in Table 6.

Comparative Examples 8–9

Polycarbonates as shown in Table 6 were individually subjected to the same pressure reducing treatment as in Example 19 but using no acid compound.

Results obtained are shown in Table 6.

Comparative Example 10

A polycarbonate as shown in Table 6 was subjected to the same pressure reducing treatment as in Example 23 but using no acid compound.

Results obtained are shown in Table 6.

TABLE 6

| Polycarbonate resin | Ex. 19 Prep. Ex. 2 | Ex. 20 Prep. Ex. 2 | Ex. 21 Prep. Ex. 3 | Ex. 22 Prep. Ex. 3 | Ex. 23 Prep. Ex. 3 |
|---|---|---|---|---|---|
| Acid compound | Phosphorous acid $H_3PO_3$ | Benzenesulfonic acid  ⬡—$SO_3H$ | Phosphorous acid $H_3PO_2$ | p-Toluenesulfonic acid $CH_3$—⬡—$SO_3H$ (mono hydrate) | p-Toluenesulfonic acid $CH_3$—⬡—$SO_3H$ (mono hydrate) |
| pKa in water at 25° C. | 1.5 | −7 (presumption) | 1.2 | −7 (presumption) | −7 (presumption) |
| Amount (mol ratio/$Na^+$) | 3 | 3 | 5 | 2 | 2 |
| Initial physical properties | | | | | |
| IV (dl/g) | 0.38 | 0.37 | 0.55 | 0.54 | 0.54 |
| YI | 1.1 | 1.2 | 1.7 | 1.6 | 1.7 |
| Light transmission (%) | 90.9 | 90.8 | 90.1 | 90.3 | 90.1 |
| Haze | 0.6 | 0.5 | 0.4 | 0.3 | 0.4 |
| MFR (g/10 min) | 50 | 55 | 6 | 6.7 | 6.5 |
| Residence stability | | | | | |
| YI | 1.3 | 1.3 | 1.9 | 1.7 | 1.8 |
| MFR (g/10 min) | 56.0 | 60.0 | 6.8 | 7.2 | 7.1 |
| Rate of increase in MFR (%) | 12.0 | 9.1 | 13.3 | 7.5 | 9.2 |
| Residual monomer (ppm) | | | | | |
| Diphenyl carbonate | 40 | 30 | 25 | 20 | 90 |
| Bisphenol-A | <5 | <5 | <5 | <5 | <5 |

| | Compar. Ex. 6 Prep. Ex. 2 | Compar. Ex. 7 Prep. Ex. 3 | Compar. Ex. 8 Prep. Ex. 2 | Compar. Ex. 9 Prep. Ex. 3 | Compar. Ex. 10 Prep. Ex. 3 | Ex. 24 Prep. Ex. 2 | Ex. 25 Prep. Ex. 3 |
|---|---|---|---|---|---|---|---|
| Acid compound | Resin disclosed in Prep. Ex. 2 | Resin disclosed in Prep. Ex. 3 | None — | None — | None — | Phosphorous acid $H_3PO_3$ | p-Toluenesulfonic acid 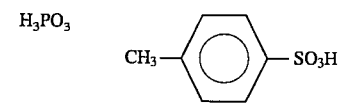 |

TABLE 6-continued

| | | | | | | | (mono hydrate) |
|---|---|---|---|---|---|---|---|
| pKa in water at 25° C. | | — | — | — | 1.5 | −7 | |
| | | | | | | (presumption) | |
| Amount (mol ratio/Na⁺) | | 0 | 0 | 0 | 3 | 2 | |
| Initial physical properties | | | | | | | |
| IV (dl/g) | 0.36 | 0.54 | 0.41 | 0.58 | 0.56 | 0.38 | 0.55 |
| YI | 1.1 | 1.6 | 1.5 | 2.0 | 2.2 | 1.1 | 1.7 |
| Light transmission (%) | 90.8 | 90.2 | 90.7 | 90.0 | 90.0 | 90.8 | 90.4 |
| Haze | 0.5 | 0.4 | 0.8 | 0.8 | 0.9 | 0.5 | 0.3 |
| MFR (g/10 min) | 56 | 6.8 | 33.1 | 5.0 | 6.0 | 51.0 | 6.0 |
| Residence stability | | | | | | | |
| YI | 1.6 | 2.1 | 2.1 | 2.8 | 3.0 | 1.3 | 1.6 |
| MFR (g/10 min) | 67.5 | 8.3 | 40.7 | 6.3 | 7.8 | 56.0 | 6.5 |
| Rate of increase in MFR (%) | 20.5 | 22.1 | 23.0 | 26.0 | 30.0 | 9.8 | 8.3 |
| Residual monomer (ppm) | | | | | | | |
| Diphenyl carbonate | 550 | 180 | 390 | 150 | 160 | 42 | 23 |
| Bisphenol-A | 8 | 15 | <5 | 10 | 10 | <5 | <5 |

What is claimed is:

1. An aromatic polycarbonate composition comprises
   (i) an aromatic polycarbonate obtained by allowing an aromatic dihydroxy compound and a carbonic acid diester to undergo melt polycondensation in the presence of an alkaline catalyst, comprised of an alkali metal compound and/or alkaline earth metal compound and
   (ii) an acid compound, said acid compound being selected from the group consisting of a Bronsted acid, Lewis acid or Ester of an acid containing a sulfur atom wherein an amount of the acid compound is 0.1–50 moles based on one mole of the sum of the alkali metal compound and/or alkaline earth metal compound.

2. The aromatic polycarbonate composition in accordance with claim 1 wherein an epoxy compound is additionally present in an amount of 0.001–0.1 part by weight based on 100 parts by weight of the aromatic polycarbonate.

3. The aromatic polycarbonate composition in accordance with claim 1 wherein the pKa of an acid residue of the ester of strong acid containing sulfur atom is not more than 3.

4. The aromatic polycarbonate composition in accordance with claim 1 wherein the sulfur containing acid is an aryl sulfonic acid or ester of an arylsulfonic acid.

* * * * *